(12) United States Patent
Krützfeldt et al.

(10) Patent No.: US 12,540,674 B2
(45) Date of Patent: Feb. 3, 2026

(54) SEALING STRIP ELEMENT AND SEALING ARRANGEMENT COMPRISING SAID SEALING STRIP ELEMENT

(71) Applicant: Siemens Energy Global GmbH & Co. KG, Bayern (DE)

(72) Inventors: Joachim Krützfeldt, Mulheim an der Ruhr (DE); Alexander Ralph Beeck, Orlando, FL (US); Shantanu P. Mhetras, Charlotte, NC (US); Mirko Milazar, Oberhausen (DE); Markus Raben, Recklinghausen (DE); Kunyuan Zhou, Berlin (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 1 day.

(21) Appl. No.: 18/286,127

(22) PCT Filed: Apr. 4, 2022

(86) PCT No.: PCT/EP2022/058844
§ 371 (c)(1),
(2) Date: Oct. 8, 2023

(87) PCT Pub. No.: WO2022/218735
PCT Pub. Date: Oct. 20, 2022

(65) Prior Publication Data
US 2024/0191796 A1 Jun. 13, 2024

(30) Foreign Application Priority Data
Apr. 13, 2021 (EP) .................................. 21168227

(51) Int. Cl.
*F16J 15/06* (2006.01)
*F01D 11/00* (2006.01)

(52) U.S. Cl.
CPC ............ *F16J 15/062* (2013.01); *F01D 11/003* (2013.01); *F05D 2250/182* (2013.01); *F05D 2250/75* (2013.01)

(58) Field of Classification Search
CPC ...... F16J 15/062; F16J 15/447; F16J 15/4472; F16J 15/4476; F16J 15/4478; F01D 11/003; F01D 11/005
See application file for complete search history.

(56) References Cited

U.S. PATENT DOCUMENTS 5,975,844 A * 11/1999 Milazar ................. F01D 11/005
277/648
7,033,138 B2 * 4/2006 Tomita .................... F01D 25/12
415/173.1
(Continued)

FOREIGN PATENT DOCUMENTS

EP 2593644 B1 2/2019
WO 2019225490 A1 11/2019

OTHER PUBLICATIONS

PCT International Search Report and Written Opinion of International Searching Authority mailed Jul. 22, 2022 corresponding to PCT International Application No. PCT/EP2022/058844 filed Apr. 4, 2022.

*Primary Examiner* — Christine M Mills
*Assistant Examiner* — L. Susmitha Koneru
(74) *Attorney, Agent, or Firm* — Wolter Van Dyke Davis, PLLC

(57) ABSTRACT

A sealing strip element for sealing a gap between two components of a gas-turbine installation, and extends along a longitudinal direction and has a contoured cross section in a ribbed central region. The sealing strip element extends along the longitudinal direction, wherein at least one of the first main surface and the second main surface includes a riffle structure, wherein the riffle structure has multiple teeth (Continued)

extending substantially from the first strip end to the second strip end along a substantially straight line while establishing chutes between them, wherein at least one dam is provided at at least one strip end of the sealing strip element.

12 Claims, 3 Drawing Sheets

(56) References Cited

U.S. PATENT DOCUMENTS

| | | | |
|---|---|---|---|
| 8,201,834 B1* | 6/2012 | Liang | F02C 7/28 |
| | | | 277/637 |
| 8,430,626 B1 | 4/2013 | Liang | |
| 10,794,211 B2* | 10/2020 | Sheedy | F01D 25/183 |
| 2011/0081235 A1* | 4/2011 | Shah | G10K 11/24 |
| | | | 415/170.1 |
| 2013/0028713 A1* | 1/2013 | Giri | F16J 15/064 |
| | | | 415/135 |
| 2013/0207351 A1 | 8/2013 | Milazar | |
| 2016/0236995 A1* | 8/2016 | Lai | B32B 18/00 |
| 2021/0189896 A1 | 6/2021 | Kono | |

* cited by examiner

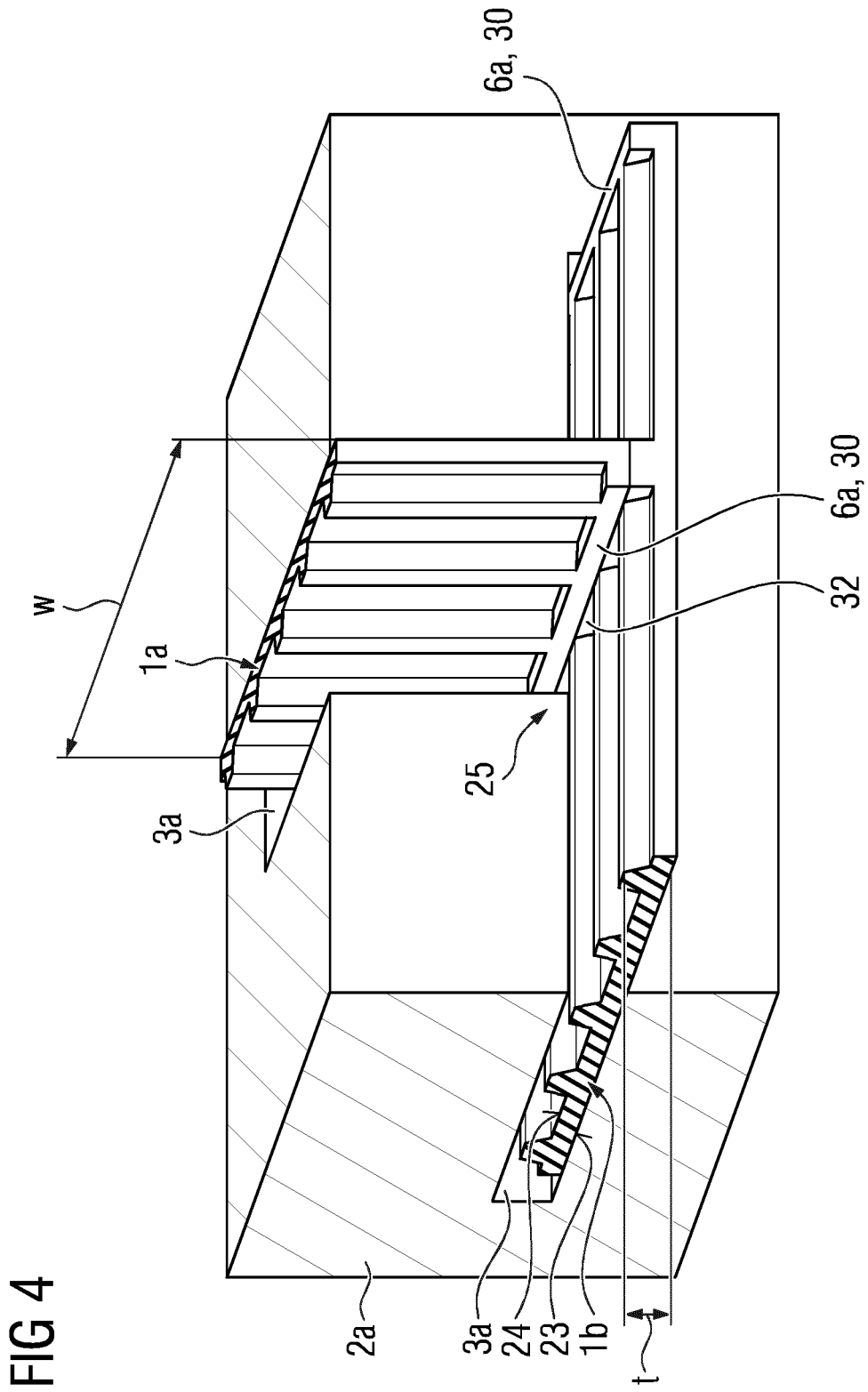

SEALING STRIP ELEMENT AND SEALING ARRANGEMENT COMPRISING SAID SEALING STRIP ELEMENT

CROSS REFERENCE TO RELATED APPLICATIONS

This application is the US National Stage of International Application No. PCT/EP2022/058844 filed 4 Apr. 2022, and claims the benefit thereof, which is incorporated by reference herein in its entirety. The International Application claims the benefit of European Application No. EP21168227 filed 13 Apr. 2021.

FIELD OF INVENTION

The invention relates to a sealing strip element for sealing a gap which is formed between two components. The invention also relates to a sealing arrangement having a such sealing strip element seated in mutually opposite component grooves of the adjacent components.

BACKGROUND OF INVENTION

In gas turbines platforms of stator vanes limit the annular flow path for the hot gas generated in combustion chambers. The platforms of adjacent stator vanes are arranged one beside the other forming small gaps therebetween. The gaps are needed for enabling thermal growth and movement of the stator vanes and their platform induced by thermal changes. In order to prevent hot gas being lost through these gaps and to avoid damage to carrier components arranged on the rear, it is known to seal these gaps with the aid of a sealing strip element, which is seated in two mutually opposite platforms grooves. At the same time, the rear area is supplied with cooling air that is needed for cooling the turbine parts. Nevertheless, these types of gaps cannot be sealed against hot gas ingestion mechanically completely. Therefore, the cooling air with a higher pressure than the hot gas can block these gaps finally by flowing out as purge air. For achieving an improved sealing, EP 0 852 659 B1 proposed that the sealing sheets have a toothed surface on one side.

In the continuously attempt to reduce the amount of cooling air resp, purging air for aiming an increased efficiency of the gas turbine new seal element designs and new sealing arrangements are needed.

Hence, it is therefore first objective of the invention to provide a long-life sealing strip element with further increased sealing properties. It is a second objective of the invention to provide a sealing arrangement comprising a such a sealing strip element.

SUMMARY OF INVENTION

Accordingly, the first objective is achieved with a sealing strip element of the independent claims. In the depending claims further preferred features are listed which can be arbitrarily combined.

According to the invention the sealing strip element for sealing a gap between two components is plate-like and has a strip thickness between a first main surface and a second main surface, which are opposingly arranged to one another, wherein the sealing strip element extends along i) a first longitudinal direction between a first strip end and a second strip end defining a strip length therebetween and ii) a second direction defining a strip width, wherein the first direction is perpendicular to the second direction, and wherein at least one of the first main surface and the second main surface comprises a riffle structure, wherein the riffle structure comprises multiple teeth extending substantially from the first strip end to the second strip end along a substantially straight line while establishing chutes between the teeth, wherein at least one dam is provided at at least one of i) the first strip end, ii) the second strip end and iii) between the two strip ends, the respective dam either closes the respective chute at the respective strip end or the dam divides the respective chute.

In this context a chute is determined as closed, if it's open to only one side and not, as in the prior art, to two or more sides.

The invention is based on the knowledge that surprisingly still a relevant amount of leakage flow, especially cooling air, is able to flow along the chutes and, if not closed, leak at the strip ends of the sealing strip element into areas of lower pressure. With the aid of the dams at at least one strip end said chute leakage flow can be reduced, so that the saved flow contributes to the increase of efficiency of the gas turbine comprising the two components. Of course, it is most beneficial when all chutes of the respective strip end are closed. This enables a comprehensive sealing at this strip end.

Especially, but not only when the sealing strip element is intended to be used in an intersection of component grooves, further dams can be provided between the first strip end and the second strip end for dividing resp, interrupting each of the otherwise full length chutes into a series of chutes arranged along the longitudinal direction. A series of chutes can comprise two, three or more chutes following each other sequentially along the longitudinal direction of the sealing strip element. Then, also an intermediate leakage flow can be blocked by the further dams.

Different technologies can be used for producing the sealing strip element with dams. In example, they can be manufactured by a direct consideration during profile machining like eroding, milling, grinding, etc. Also, appropriate closure parts can be attached to riffle seal strip elements by welding or brazing or due to mechanical deformation. Alternatively, 3D printing the whole sealing strip element with the appropriate dams is also possible.

The utilization of dams still allows a tight fit of the sealing strip element in the component grooves, especially in areas between the dams. The above-mentioned chute flow can thereto be minimized and the disadvantage due a looser riffle seal fit can mainly be avoided, in order to minimize the overall leakage.

In general, even if a chosen term is used in the singular or in a specific numeral form in the claims and the specification the scope of the patent (application) should not be restricted to the singular or the specific numeral form. It should also lie in the scope of the invention to have more than one or a plurality of the specific structure(s).

A component is intended to mean a component provided for a turbine, like a gas turbine, like, for example, a rotor blade or stator vane or a part thereof, especially their inner or outer platforms. The turbine component may further be embodied as a turbine heatshield, a turbine ring segment or a part of a combustor of the turbine, wherein all these parts mentioned here are subjected to high temperatures (so-called hot parts). The component may be a part of a turbine assembly.

In a preferred embodiment the height of the teeth of the riffle structure and the height of the dams are determined with regard to the bottom level of the chutes. The dams have at least substantially the same height as the teeth. Hence, no single tip protrudes over the remaining main sealing strip element thickness. Hence, the proposed closed chutes are preferably used for leakage flow reduction at the strip ends.

Depending on the type of application, especially the design of the grooves of the components, in which the sealing strip element is engaged, in a further preferred embodiment both, the first strip end and the second strip end of the sealing strip element comprises at least one dam, preferably multiple dams. This blocks any chute leakage at each strip end of the sealing strip element.

According to the invention, the inventive sealing strip element can be assembled in a scaling arrangement comprising two components, which are spaced apart opposite one another by a gap, wherein the mutually opposite walls of the components are each provided with a component groove in which a sealing strip element is partly engaged in order to seal the gap.

According to a preferred realization of the invention each component comprises at least two grooves intersecting each other in T-style, wherein in each pair of mutually opposite grooves one corresponding sealing strip element is arranged such, that at least one of its dam is in the intersection area. Hence, the two sealing strip elements are arranged likewise in T-style so that in the intersection area the dams block partly or completely the chute leakage flows. Further reduction of leakage flow can be achieved in a further preferred embodiment, when both sealing strip elements comprises dams, which are located next to each other in the intersection area. This means, that the first of these two sealing strip elements may has closed chutes at its first or second strip end, while the second sealing strip element has further dams that are arranged between the two strip ends. In this case the strip end dams of the first sealing strip element interacts with the further dams of the second sealing strip element by reducing or eliminating the free cross section therebetween over the complete strip widths. If the first sealing element comprises no dams at its respective sealing strip end, then the sealing contact area is slightly decreased. In this case a tooth-carrier-portion of the sealing strip elements still extents over the completely width of the sealing strip element and forms one of the two partners of the sealing.

In this context, the T-style of intersections does not require that the component grooves, in which the two sealing strip elements are assembled, has to be perpendicularly to one another. Also, when the two component grooves of the same component approaches each other under a different angle at the intersection, in example at an angle of 30°, 45° or 60°, still a T-style of intersection is established in the sense of this invention. Hence, the said angle can be of course of any appropriate size.

The previously given description of advantageous embodiments of the invention contains numerous features which are partially combined with one another in the dependent claims. Expediently, these features can also be considered individually and be combined with one another into further suitable combinations. Furthermore, features of the method, formulated as apparatus features, may be considered as features of the assembly and, accordingly, features of the assembly, formulated as process features, may be considered as features of the method.

The above-described characteristics, features and advantages of the invention and the manner in which they are achieved can be understood more clearly in connection with the following description of exemplary embodiments which will be explained with reference to the drawings. The exemplary embodiments are intended to illustrate the invention but are not supposed to restrict the scope of the invention to combinations of features given therein, neither with regard to functional features. Furthermore, suitable features of each of the exemplary embodiments can also be explicitly considered in isolation, be removed from one of the exemplary embodiments, be introduced into another of the exemplary embodiments and/or be combined with any of the appended claims.

BRIEF DESCRIPTION OF THE DRAWINGS

The present invention will be described with reference to drawings in which:

FIG. 4 shows in a perspective view the sealing arrangement in accordance with FIG. 3.

DETAILED DESCRIPTION OF INVENTION

Figure 1:
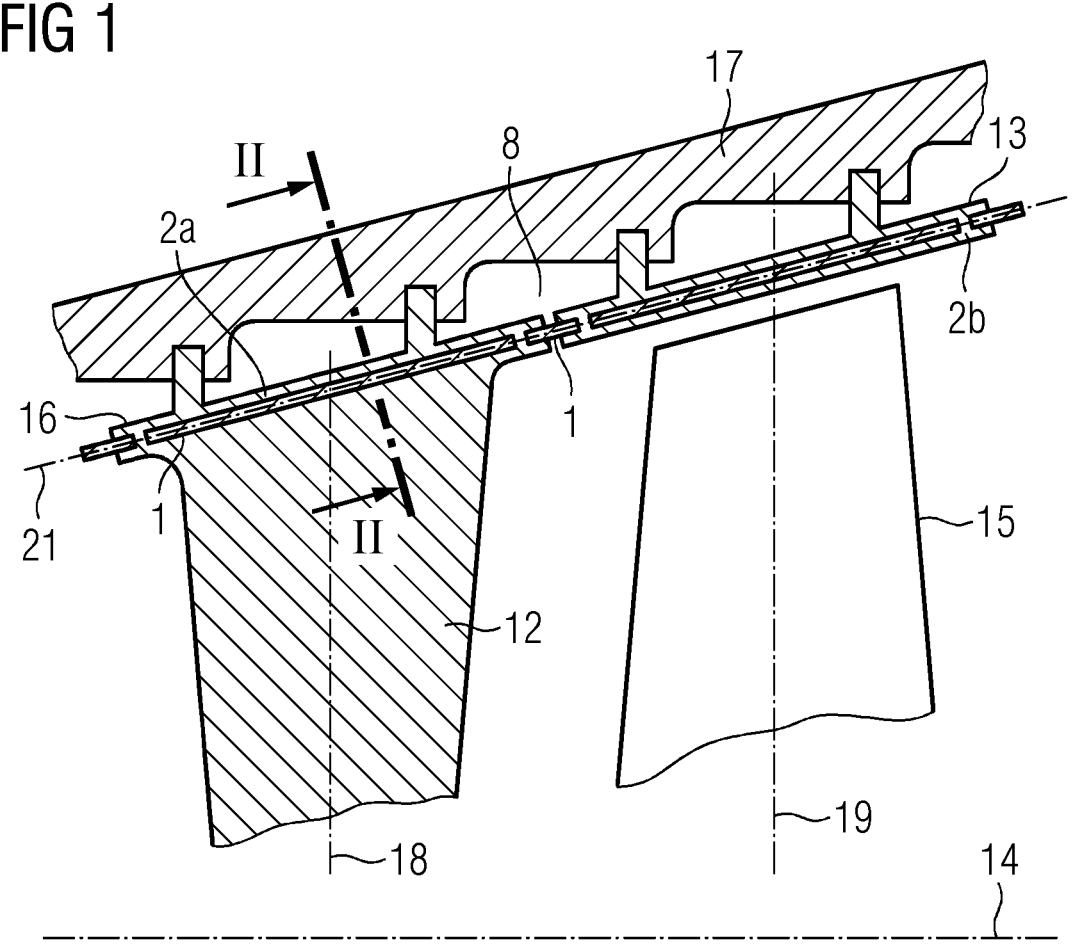
FIG. 1 shows part of a longitudinal section through a gas-turbine installation.

FIG. 1 illustrates a gas-turbine installation directed along a main axis 14. This gas-turbine installation has stator vanes 12 and rotor blades 15 alternating in the axial direction in a housing 17. The stator vanes 12 are directed along a radial axis 18 perpendicular to the main axis 14 and are arranged along the circumference of the gas-turbine installation to form a circle. The stator vanes 12 are connected to the housing 17 of the gas-turbine installation via a respective stator vane platform 16. Along the circumference, adjacent platforms 16 are spaced apart from one another by a respective gap 5 (see FIG. 2), as a result of which they can expand largely freely as a result of thermal action.

The stator vane platforms 16 separate a hot-gas region 11, which is formed around the main axis 14 of the gas-turbine installation, from a cooling air area 8, which is formed between the stator vane platforms 16 and the turbine housing 17. The rotor blades 15 extend along a respective main axis 19, which is likewise essentially orthogonal to the main axis 14 of the gas-turbine installation. The rotor blades 15 are located entirely within the hot-gas region 11. This hot-gas region 11 is separated from the cooling air area 8 along the circumference of the gas-turbine installation by a plurality of wall components 13, also known as heat shields or ring segments. The wall components 13 here are each adjacent to the moving blades 15. The wall components 13 are connected to the turbine housing 17. For the sake of clarity, in each case just one stator vane 12, one rotor blade 15 and one wall component 13 have been illustrated. As seen in the axial direction, a respective wall component 13 is spaced apart by a gap 5 from a respective stator vane 12, in particular, the stator vane platform 16. This gap 5 is sealed by a sealing strip element 1 as a result of which largely a flow of cooling gas out of the cooling air area 8 into the hot-gas region 11 is prevented. The stator vane 12 here constitutes a first component 2a and the wall part 13 constitutes a second component 2b. As seen in the axial direction, the cooling air area 8 is sealed from the hot-gas region 11 by stator vane platforms 16 and wall components 13 and, as seen in the circumferential direction, sealing takes place in each case between adjacent stator vanes 12 and between correspondingly adjacent wall components 13.

Figure 2:
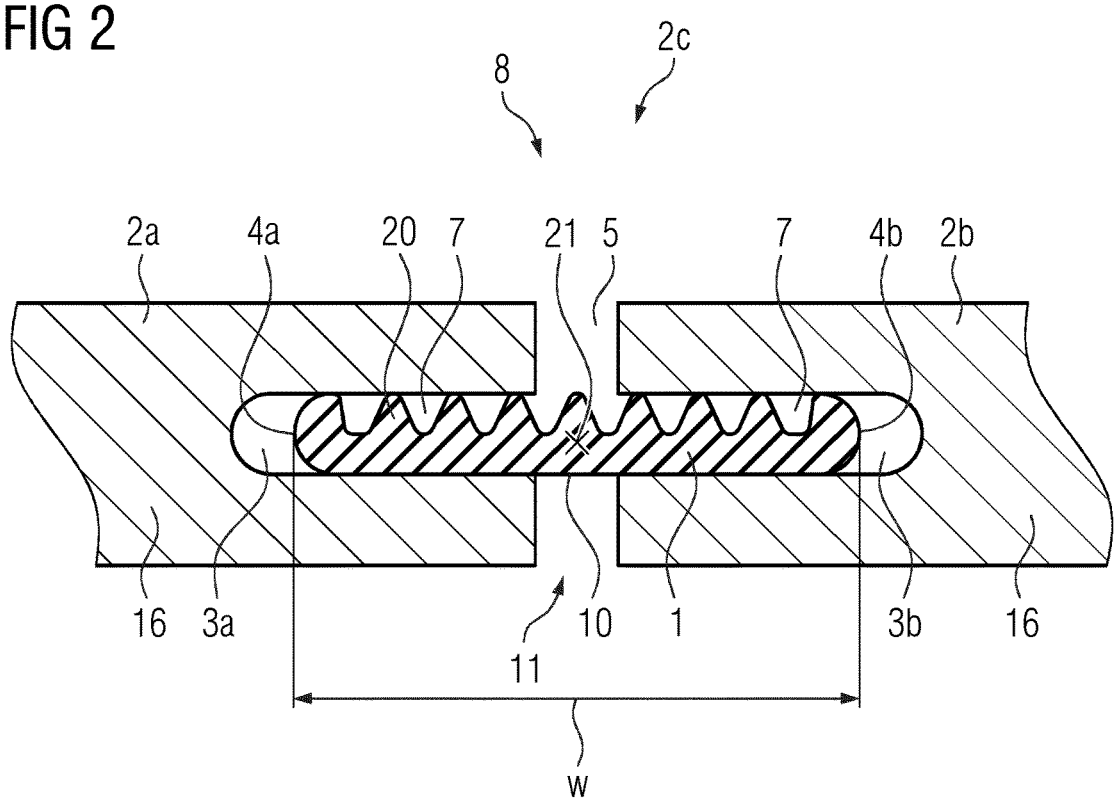
FIG. 2 shows the cross section through a sealing arrangement of a gas-turbine installation having a sealing strip element, FIG. 3. shows in a plan view the sealing strip element according to a preferred exemplary embodiment

FIG. 2 shows a section, taken along the circumference of the gas-turbine installation, through two adjacent components 2a, 2b. The two components 2a, 2b are part of a scaling arrangement 2c and are spaced apart from one another by a gap 5. The components 2a, 2b may each be two adjacent stator vanes 12, in particular stator vane platforms 16 and/or two adjacent wall components 13. As seen in the circumferential direction in each case, a component groove 3a, 3b is provided in the components 2a, 2b, respectively. A sealing strip element 1 engages in both component grooves 3a, 3b to seal the gap 5. The sealing strip element 1 is directed along a first, longitudinal direction 21 and has, in the cross section illustrated, in a direction perpendicular to the longitudinal line 21, a first lateral end 4a, a second lateral end 4b and a central region 10 located therebetween. The central region 10 has a plurality of ribbing chutes 7 directed toward the cooling air area 8, wherein a respective sealing tooth 20 is formed between adjacent chutes 7, as a result of which the central region 10 has the riffle structure on one of its two main surfaces 23, 24 (FIG. 4). The sealing teeth 20 are arranged on a tooth-carrier portion 10 of the sealing strip element 1. Each chute 7 and each sealing tooth 20 extends parallel to the longitudinal line 21 and perpendicularly to a possible main leakage flow along the gap 5.

The component grooves 3a, 3b each have groove side walls each located opposite, and parallel, to one another. Since usually the pressure of the cooling gas in the cooling area 8 is higher than the pressure of the hot gas in the hot-gas-channeling region 11, the sealing strip element 1 has its smooth surface resting on the side walls of the component grooves 3a, 3b, and therefore the sealing teeth 20 are rather relieved of mechanical loading.

Figure 3:
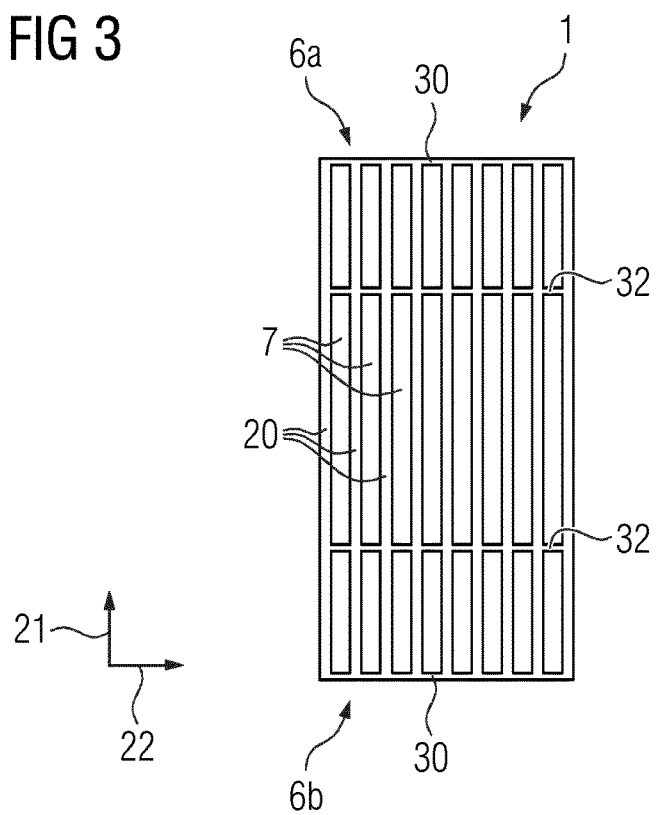

FIG. 3. shows in a plan view the sealing strip element 1 according to a preferred exemplary embodiment. It comprises multiple teeth 20 extending in a longitudinal direction 21 from a first strip end 6a to a second strip end 6b. The sealing strip element 1 has a strip length which is determined between the two strip ends 6a, 6b, whereas a strip width w (FIG. 4) is determined in perpendicular direction 22, between the first and second lateral ends 4a, 4b. Between each to directly adjacent tooth 20 chutes 7 are established. At each first and second strip end 6a, 6b dams 30 are provided for closing the respective chutes 7. According to this exemplary embodiment, the displayed sealing strip element 1 comprises also the further dams 32, which are optional, but when arranged, divides or interrupts the otherwise single chute 7 between two dedicated teeth 20 into a series of chutes 7 between them.

The sealing strip element 1 according to the preferred exemplary embodiment is in plan view of rectangular shape. Other shapes, of course, like rhomboidal or even trapezoidal shapes, etc., are also possible. Likewise, the shape of the teeth in cross section can—as shown in FIG. 2, triangular, or alternatively rectangular.

Finally, FIG. 4 shows in a perspective view the sealing arrangement 2c in accordance with FIG. 3 in a situation, in which two component grooves 3a of the same component 2a merges in T-style in an intersection area 25 into one another. One sealing strip element 1a, 1b is arranged in each of the two component grooves 3a. For the sake of better understanding the mutually arranged second component 2b is not displayed in FIG. 4.

The height of the teeth 20 of the riffle structure and the height of the dams 30, 32 are determined with regard to the bottom level of the chutes 7. The dams 30, 32 have in this exemplary embodiment the same height as the teeth 20 for maintaining a constant and evenly distributed thickness t of the sealing strip element, provided, that the reduced thickness in the areas of the chutes 7 is ignored. Nevertheless, in single configurations it might be beneficial to have dams 30, 32, whose heights are different to the height of the teeth 20.

To reduce the chute leakage flows both sealing strip elements 1a, 1b are equipped with dams 30, 32, either at its strip end 6a and/or at an intermediate position between its strip ends 6a, 6b. In detail, in the area of the intersection 25, where the one strip element 1a is able to get in contact with the other strip element 1b, the application of dams 30, 32 enables the establishment of a contact over the complete width of the sealing strip elements 1a, 1b. This reduces the size of the unblocked cross-section between the two sealing strip elements 1a, 1b significantly. The leakage flow from a high-pressure area to a low-pressure area is thereby reduced or at best, avoided. A reduction of leakage flow can still be achieved when the sealing element 1a is of conventional style, as long the sealing element 1b comprises further dams 32. In this case the sealing contact area is slightly reduced as only the thickness of the tooth-carrier-portion 10, which still extends over the complete width of the sealing strip element, contributes to the sealing.

Overall, the invention relates to a sealing strip element 1 which is designed for sealing a gap 5 between two components 2a, 2b, in particular a sealing arrangement 2c of a gas-turbine installation, and extends along a longitudinal direction 21 and has a contoured cross section in a ribbed central region 10. As seen in cross section, the sealing strip element 1 extends along the longitudinal direction 21, wherein at least one of the first main surface 23 and the second main surface 24 comprises a riffle structure, wherein the riffle structure comprises multiple teeth 20 extending substantially from the first strip end 6a to the second strip end 6b along a substantially straight line while establishing chutes 7 between them, wherein at least one dam 30, 32 is provided at at least one strip end 6a, 6b of the sealing strip element 1, the dam 30 closes the respective chute at the respective strip end 6a, 6b of the sealing strip element 1 for reducing chute leakage flow. Further, the invention relates to a sealing arrangement 1 of two neighbored components 2a, 2b comprising at least one of the sealing strip elements 1 equipped with dams.

The invention claimed is:

1. A sealing strip element for sealing a gap between two components,
wherein the sealing strip element is plate-like and comprises a strip thickness between a first main surface and a second main surface, which are opposingly arranged to one another,
wherein the sealing strip element extends along a first, longitudinal direction between a first strip end and a second strip end defining a strip length therebetween and along a second direction defining a strip width, wherein the first direction is perpendicular to the second direction,
wherein the sealing strip element is configured for being located in opposingly arranged grooves of two components to seal the gap,
wherein at least one of the first main surface and the second main surface comprises a riffle structure,
wherein the riffle structure comprises teeth extending substantially from the first strip end to the second strip end along a substantially straight line while establishing chutes between the teeth,
wherein at least one dam is provided at at least one of
i) the first strip end,
ii) the second strip end, and iii) between the first and second strip ends,
wherein the at least one dam closes the respective chute at the respective strip end or the at least one dam divides the respective chute, and
wherein the at least one dam is oriented transverse to the teeth.

2. The sealing strip element according to claim 1, comprising:
wherein the at least one dam comprises multiple dams at the respective strip end for closing all the chutes at the respective strip end of the sealing strip element.

3. The sealing strip element according to claim 1,
wherein a height of the teeth of the riffle structure and a height of dams of the at least one dam are determined with regard to a bottom level of the chutes, and
wherein the dams have substantially the same height as the teeth.

4. The sealing strip element according to claim 1,
wherein both ends of the sealing strip element comprise a respective dam of the at least one dam.

5. The sealing strip element according to claim 1,
wherein, between the first strip end and the second strip end, further dams of the at least one dam are provided for dividing all full length chutes of the chutes, each of which are arranged between two directly adjacent teeth, into a series of chutes arranged along the longitudinal direction.

6. A sealing arrangement comprising:
a sealing strip element according to claim 1, and
the two components which are spaced apart opposite one another by the gap, wherein mutually opposite walls of the two components are each provided with a component groove in which the sealing strip element is arranged in order to seal the gap.

7. The sealing arrangement according to claim 6,
wherein each component comprises at least two grooves intersecting each other in T-style, and
wherein, in each of the two pairs of mutually opposite grooves, a respective sealing strip element is engaged such, that a first or a second strip end of one of the two sealing strip elements is located in an intersection area next to further dams of the at least one dam of the other of the two sealing strip elements.

8. The sealing arrangement according to claim 7,
wherein both sealing strip elements comprise dams of the at least one dam, which are located next to each other in the intersection area.

9. The sealing strip element according to claim 4,
wherein both ends of the sealing strip element comprise multiple dams.

10. The sealing arrangement of claim 8,
wherein both sealing strip elements comprise dams of the at least one dam which are in contact with one another.

11. The sealing strip element of claim 1,
wherein the at least one dam comprises a first dam and a second dam;
wherein the first dam intersects a first end of a tooth of the teeth; and
wherein the second dam intersects a second end of the tooth.

12. A sealing arrangement comprising:
a sealing strip element for sealing a gap between two components,
wherein the sealing strip element is plate-like and comprises a strip thickness between a first main surface and a second main surface, which are opposingly arranged to one another,
wherein the sealing strip element extends along a first, longitudinal direction between a first strip end and a second strip end defining a strip length therebetween and along a second direction defining a strip width, wherein the first direction is perpendicular to the second direction,
wherein the sealing strip element is configured for being located in opposingly arranged grooves of two components to seal the gap,
wherein at least one of the first main surface and the second main surface comprises a riffle structure,
wherein the riffle structure comprises teeth extending substantially from the first strip end to the second strip end along a substantially straight line while establishing chutes between the teeth,
wherein at least one dam is provided at at least one of
i) the first strip end,
ii) the second strip end, and
iii) between the first and second strip ends,
wherein the at least one dam closes the respective chute at the respective strip end or the at least one dam divides the respective chute,
the two components, which are spaced apart opposite one another by the gap, wherein mutually opposite walls of the two components are each provided with a component groove in which the sealing strip element is arranged in order to seal the gap,
wherein each component comprises at least two grooves intersecting each other in T-style, and
wherein, in each of the two pairs of mutually opposite grooves, a respective sealing strip element is engaged such, that a first or a second strip end of one of the two sealing strip elements is located in an intersection area next to further dams of the at least one dam of the other of the two sealing strip elements.

* * * * *